O. HALVORSEN.
TRAIN POSITION INDICATOR.
APPLICATION FILED MAR. 23, 1908.
918,537.
Patented Apr. 20, 1909.
4 SHEETS—SHEET 1.
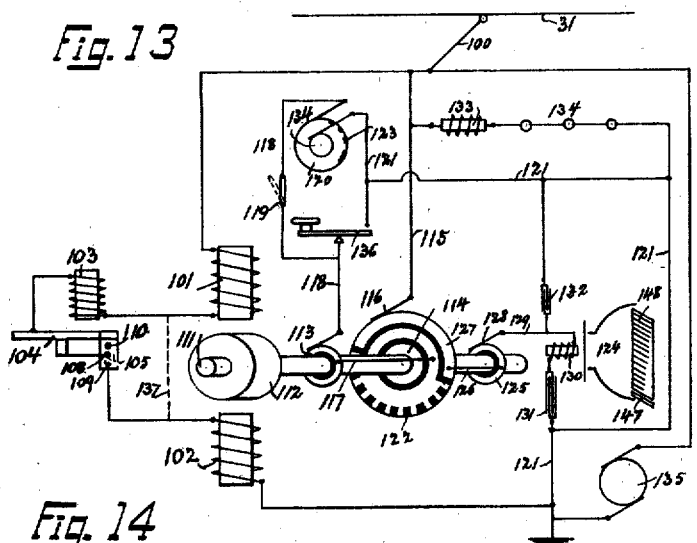
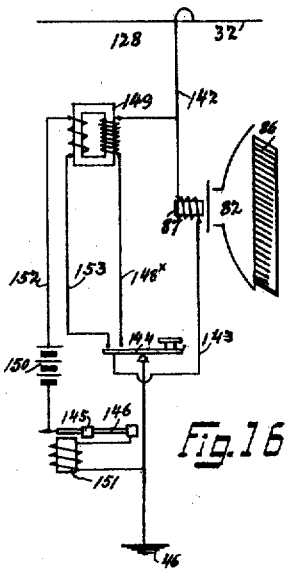
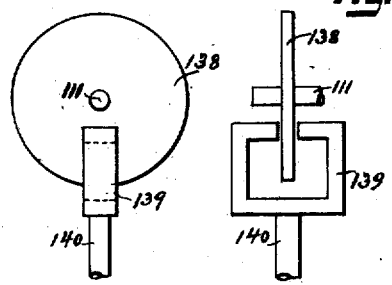
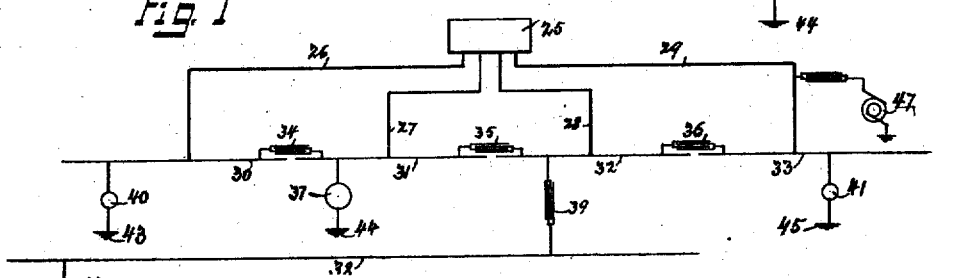
WITNESSES:
INVENTOR
BY
ATTORNEY

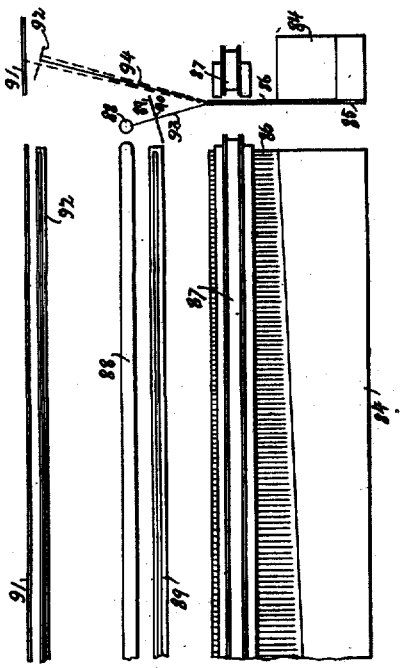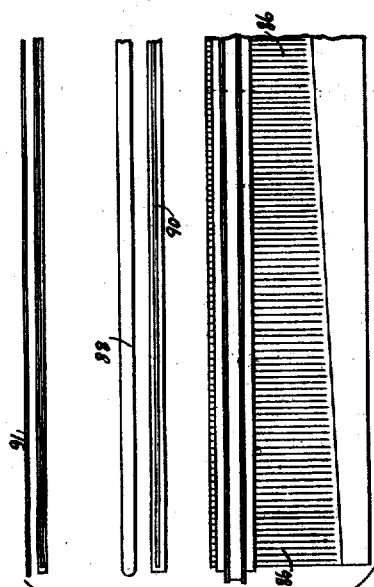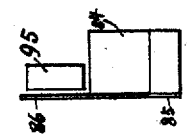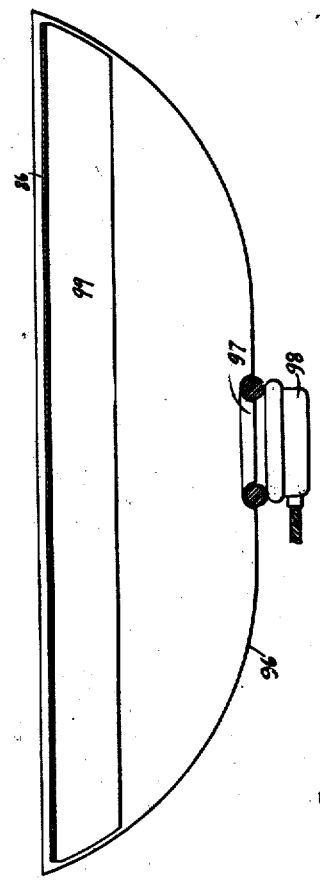

O. HALVORSEN.
TRAIN POSITION INDICATOR.
APPLICATION FILED MAR. 23, 1908.
918,537.
Patented Apr. 20, 1909.
4 SHEETS—SHEET 3.
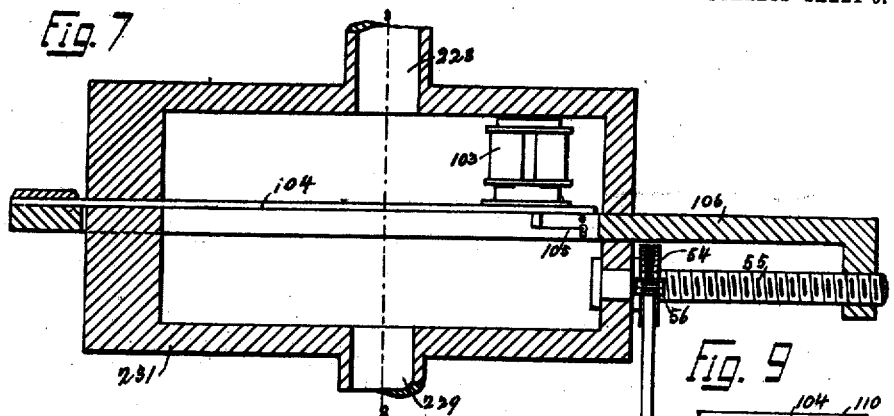
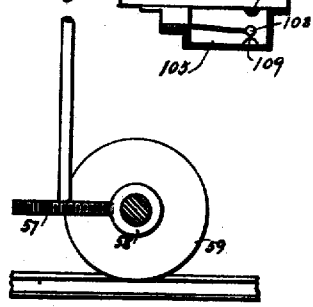
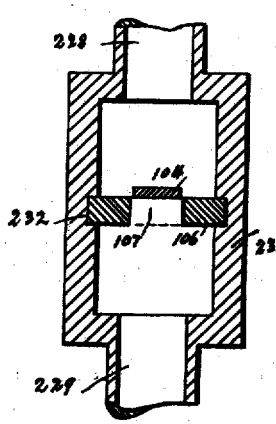
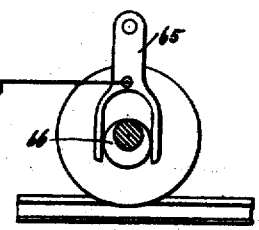
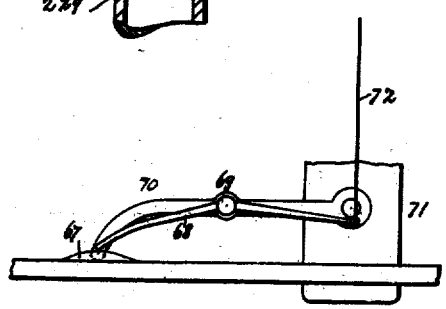
WITNESSES:
B. M. Tolhurst
a Fairweather
Olaf Halvorsen
INVENTOR
BY [signature]
ATTORNEY
THE NORRIS PETERS CO., WASHINGTON, D. C.

O. HALVORSEN.
TRAIN POSITION INDICATOR.
APPLICATION FILED MAR. 23, 1908.
918,537.
Patented Apr. 20, 1909.
4 SHEETS—SHEET 4.
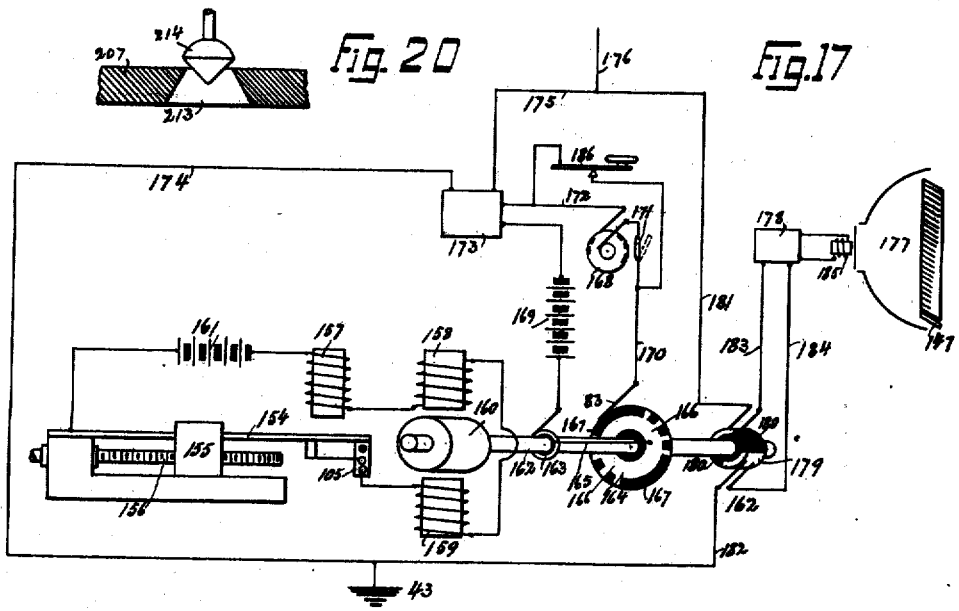
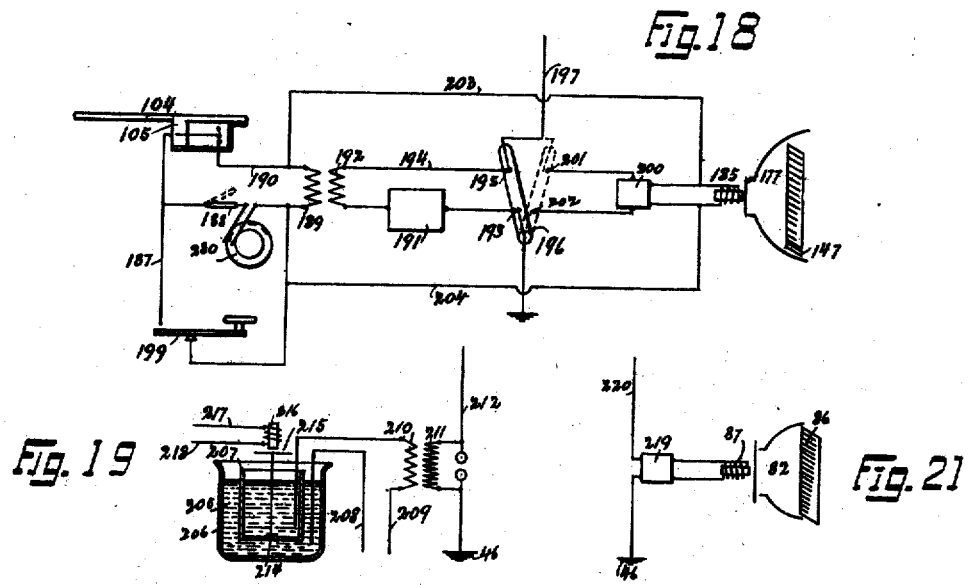
WITNESSES:
B. M. Tolhurst
A. Gainsworth
Olaf Halvorsen
INVENTOR
BY J. L. Cooper
ATTORNEY.

UNITED STATES PATENT OFFICE.

OLAF HALVORSEN, OF SCHENECTADY, NEW YORK.

TRAIN-POSITION INDICATOR.

No. 918,537.   Specification of Letters Patent.   Patented April 20, 1909.

Application filed March 23, 1908. Serial No. 422,675.

*To all whom it may concern:*

Be it known that I, OLAF HALVORSEN, a subject of the King of Norway, having declared my intention to become a citizen of the United States, and a resident of the city of Schenectady, New York, have invented a new and useful Improvement in Train-Position Indicators, of which the following is a specification.

The object of my invention is to provide means for indicating to an observer or observers at a distant point or points the position, as well as the direction and rate of speed, of any or all of the trains, cars or other road vehicles on a given line or section. By means of this system, train despatchers or other officials may be automatically, continuously and certainly advised of the position at any given moment of all the cars or trains under their control. If desired such information may also be continuously given to any or all cars as to the position etc. of all the other cars on the line. The system may also provide means of communication, either telegraphic or telephonic, between any car and the receiving station, or between the cars themselves.

Other objects of the invention will appear in the specification, and be pointed out in the claims.

In the description and claims, I shall hereafter use the word "car", including therein a train of cars, as well as any vehicle to which my system may be advantageously applied.

Broadly speaking, my device includes means carried on a car for creating, varying or controlling a continuous series of electric impulses, means at an observing station for selectively receiving and interpreting such impulses and an electric connection between the transmitting and receiving devices. The series of impulses varies in rate or form in predetermined relation to the distance traveled by the car from a given point, as the end of the line. The rate varying portion of the device may be actuated through a connection with one of the wheels of the car, preferably one to which no brake-power is applied, an extra wheel being used for this purpose if required. Or it may be actuated by other means, as *e. g.*, a lever tripped by a series of projections on one of the rails, or on a "third rail", where this is employed. This rate varying portion is set to produce a given number of current interruptions when the car starts from the end of the line or section, which number is gradually increased or diminished as the car proceeds. The receiver may consist of a graduated series of metal prongs or reeds "tuned" to constantly accelerated frequencies and placed in juxtaposition to a magnet, which is affected by the varying impulses from the transmitter. These reeds receive rays of light from a suitably disposed lamp, and when selectively vibrated, reflect them on to a plate, or preferably through a translucent plate, on or parallel to which may be displayed a developed map of the road. The impulses may be carried from the sending to the receiving device through the power circuit, through telephone or special wires, by induction, by Hertzian waves, or by any other means known to the art. The power required for feeding the current varying means may be the electric current taken from the power circuit, a current generated by a special dynamo and transmitted through the power circuit, or from a dynamo, primary or storage battery carried on the car; or any other desired source of power may be employed.

I will proceed to describe various devices for creating, varying, transmitting and receiving electric impulses; for telegraphic communication; and for other purposes connected with my signaling system. It is however to be understood that these devices may be employed in combinations other then those shown; that other devices may be employed; and that, in general, my invention, in its broadest aspect, is not limited to the particular mechanism used.

In the drawings, Figure 1 is a diagram of an electric trolley line equipped with my system; Fig. 2 is a diagram of one form of my device; Fig. 3 is a front, and Fig. 4, an end elevation of the receiving mechanism; Fig. 5 is a partial end view similar to Fig. 4, but showing a modification; Fig. 6 is a partial top plan view of a modified form of the receiver; Fig. 7, partly in central longitudinal section, shows a vibrating device and means of actuating the same; Fig. 8 is a transverse vertical section through the plane 8—8, Fig. 7; Fig. 9 is an enlarged fragmentary view of the device of Fig. 7; Fig. 10 is an elevation of another form of actuating mechanism for the vibrator; Fig. 11 is an elevation, and Fig. 12, a top plan view of a modification of part of the actuating device of Fig. 10; Fig. 13 is a diagram, like that of Fig. 2, but of a modified form of my device; Figs. 14 and 15 are elevations, at right angles with each other, of parts of an interrupting device which may be substituted for that shown in Fig. 13; Fig. 16 is a diagram of a receiving and telegraphing device; Figs. 17 and 18 are diagrams of two other modifications of my device; Fig. 19 shows a modified form of current interrupter; Fig. 20 is a fragmentary section of a part of Fig. 19, enlarged; Fig. 21 is a modified form of the receiver adapted to Hertzian waves.

In Fig. 1, which shows my signal system or car position indicator as applied to an electric trolley line, 25 indicates a power house connected by feeders 26, 27, 28, 29 to a working conductor or main line, of which sections 30, 31, 32, 33 are shown. These may be connected by means of high resistance, induction coils or condensers, the latter being indicated at 34, 35, 36. 37 designates a car provided with a transmitting device, which forms a part of my invention. 40, 41 are other cars provided with my receiving devices. 42 is a station, e. g., a train despatcher's office, also provided with a receiver, and connected with the working conductor by a wire 38, in which is inserted a condenser 39. 43, 44, 45, 46 are "grounds", which may of course be the rails of the line, or any return conductor. Where it is desired to operate the signal system by a current other than that used for moving the cars, a generator 47, adapted to produce direct, alternating or pulsating currents, may be located at any desired point on the line and connected with the working conductor as shown. I use the term "working conductor" to include overhead wire, third rail or any conductor of the car moving current. It is of course obvious that all the cars will ordinarily be provided with transmitters; that all of them may have receivers, if desired, and that any useful number of office stations, as 42, may be connected with the signal system. As will be shown, each transmitter is adapted to indicate the number or other designation of the car on which it is carried, and the receivers are selective, so that the position of each car is clearly perceived.

In the form of my system shown in Fig. 2 of the drawings, an electrolytic interrupter is used as a current-varying device. 48 is a current collector, shown as a trolley pole, from which current passes through the indicator wheel 49, which is rotated by any convenient means, not shown, thence through switch 50, interrupter 51 and variable inductance 52 to ground. The interrupter 51, of well known form, will act to make and break the circuit at a rate per second, which is a function of the voltage employed, the resistance of the interrupter and that of its circuit, the size of the electrodes and the inductance of the circuit. By varying any one of these factors differences in the rate or the force of the interruptions may be produced. In this device this difference is gained by varying the self induction in the interrupter circuit, i. e., by slowly moving the core 53 out of its position within the coil 52. This of course decreases the inductance and correspondingly accelerates the rate of the interruptions.

Several methods of gradually withdrawing and replacing the core from and within the coil, all of them dependent on and corresponding to the progress of the car in its route, are shown in Figs. 7 to 12 of the drawings. Thus the shaft of the core 53 may be connected to a threaded part 55, Fig. 7, which is very slowly rotated through a worm gear 54, worm 56, worm wheel 57 and worm 58 secured on the axle of a wheel 59 of the car. It is obvious that the gear is so timed that the desired withdrawal of the core 53 from the coil 52 will correspond with the travel of the car from end to end of its trip. In another form, Fig. 10, the shaft of core 53 is suitably geared to the shaft ratchet 60, turned step by step by a spring pawl 61, connected through rods 63, 63 and bell-crank lever 64 to a fork 65 moved by an eccentric 66 on a car axle. Instead of deriving the movement of the core 52 from a wheel of the car, it may be obtained by providing one of the rails, or preferably a third rail, where this is used, with an equably spaced series of lugs or projections 67, Figs. 11 and 12, which successively trip a bent lever 68 pivoted at 69 on an arm 70 secured to the contact shoe 71. From the lever 68 a rod 72 takes the place of the rod 62, Fig. 10, and actuates the pawl device therein shown.

Referring to Figs. 1 and 2, it is obvious that the current pulsations or fluctuations set up by the interrupter 51, and gradually accelerated in correlation with the travel of the car by the movement of the core 53, will pass from ground 44, through wire 73, coil 52, switch 50, indicating wheel 49, collector 48, line wire sections 31, 32, condensers 35, 39, and line 38 to station 42, thence to ground 46; so that the transmitter on car 37 will be in constant connection with the receiving device in the station, or with such devices in any desired number of such stations as may be cut into the circuit, as well as with the receivers in the other cars, as 40, 41, traveling in either direction.

At the right of Fig. 2, is shown a receiving device mounted on a car in connection with the transmitter already described. By shifting the switch 74 to contact 75, as shown in dotted lines, which shifting may be done manually or automatically as desired, the transmitter is cut out of circuit and the current from collector 48 passes through wire 76, including condenser 77, and through the coil of an electromagnet 78 to ground 44. 79 indicates a motor on the car, 80 an inductance, in series with the inductionless circuits. The magnet 78 forms part of the receiving device 82, to be presently described. Should the crew of the car, as 37, desire to communicate telegraphically with the station 42, the switch 50 may be opened, as shown in dotted lines, and the key 83 be operated in the usual manner. It is of course understood that the fluctuations or pulsations set up by the interrupter 51 are prevented from being absorbed by other circuits on the car by reason of their inductance. Also, that when the switch 74 is in contact with button 75, the receiver 82 will be in circuit with the transmitters of all the other cars on the line or section.

I will now describe the form of selective receiver 82 shown in Figs. 3 and 4 of the drawings. It consists of a suitably supported wedge-shaped bar 84, to the front face of which is secured an iron plate 85, one side of which is sawed into a series of blades or reeds 86, shown as of graduated length, but which in any case must be tuned to vibrate successively in consonance with a series of impulses, the rate of which is gradually accelerated or diminished. In front of and adjacent to the free ends of the reeds 86 is placed an electro-magnet 87, the winding of which is in circuit between grounds, as 44 and 46, already described. Mounted above the reeds 86 is a source of light, shown as an electric lamp 88, the length of which is approximately that of the plate 85. Suported between the lamp 88 and the reeds 86 is a plate 89, having a longitudinal slot 90, through which a beam of light passes to the polished ends of the reeds 86. 91 is a translucent plate positioned to receive and pass the rays of light reflected from the ends of the reeds 86. On this plate, preferably of glass, may be pasted a developed map of the road showing stations, switches, crossings, etc. Below the glass plate 91 is a second slotted opaque plate 92, adapted to intercept the light rays reflected from the ends of the reeds 86 when these are in their normal position, and to pass such rays during a part of their deflected vibration. If then, any reed 86 is vibrated by the attraction of the magnet 87, a spot of light will appear on the plate 91 immediately above the reed. If the map be made semi-translucent, the spot may be made to appear on the lines indicating the road. A ray of light before and after reflection is indicated at 93, 94, Fig. 4. It is of course understood that the harmonic series of reeds 86 must be so tuned as to successively vibrate with the entire range of impulses produced by the interrupter 51 during the extreme movement of the core 53, which corresponds with the complete trip of the car.

Fig. 5 shows a static receiver, in which the magnet 87 is replaced by a metal bar 95, the other parts being as just described. If now the plate 85, in which the reeds 86 are cut, is connected to one terminal of the signal circuit, and the bar 95 to the other terminal, the static attraction between them will vibrate the reeds 86, with the effect already described.

Fig. 6 shows another modification of the receiver, in which is a shallow bell or sounding-board, having an aperture 97, to which an ordinary telephone receiver 98 is applied. Within the mouth of the bell 96 is placed a bar 99, similar to the bar 84, and serving to support the plate in which are cut the reeds 86. The parts 88 to 92, not shown, are as before described, or these may be omitted where aural signals only are required. It is evident that the vibrations of the telephone diaphragm will be concentrated on the reeds 86, and that if the telephone be placed in circuit with the transmitter on the car, the reeds will be successively vibrated.

I have now described a complete train position indicator or signal system, including several receiving devices. I do not desire to limit my invention to these forms, but rather to show that it is capable of embodiment in many forms, limited only by the breadth of the art or the skill of the constructing engineer. With this purpose in view, I will now describe other forms of transmitting devices.

Fig. 13 is a diagram of a complete system, including both transmitter and receiver, to be used where the former is supplied with direct current, either from the power dynamos or from a special dynamo, through the working conductor. 100 designates a collecting device, through which the current passes to the coils of the field magnets 101, 102 and actuating magnet 103, as well as the vibrating bar 104 and interrupter 105 to ground 44. The bar 104 and interrupter 105, with their coördinating parts are clearly shown in Figs. 7, 8 and 9. The bar or reed 104 is secured at one end to the end of a sliding bar 106, having a slot 107, and has attached to its free end the interrupter 105, which consists of a resilient metal tongue 108, contact 109 and insulating striking block 110. The bar 106 is threaded for the reception of a screw 55, from which it receives slow longitudinal movement, by means of the apparatus already described. When the bar 104 is at rest, the tongue 108 contacts with the part 109. When current is turned on, the magnet 103, mounted on and moving with the bar 106, attracts and raises the free end of the reed 104, to which the part 105 is attached. The tongue 108 rests against the contact 109 until the reed 104 has reached the upward limit of its movement, when the tongue continues to move independently of the part 104, by reason of its inertia, and breaks the contact, striking against the block 110. The breaking of the circuit releases the reed 104, the dropping of which again contacts 108 and 109 and closes the circuit. As a means of vibrating the reed 104, which means may be either additional or alternative to the magnet 103, I may mount the bar 106 to slide through a closed case 231, in which it is guided by grooves 232, the case 231 being provided with ports 228, 229, connected with suitable means, not shown, for supplying air or steam, under pressure or tension in regular impulses, see Figs. 7 and 8. Whatever means for vibrating the reed are employed, it is evident that a series of pulsating currents will be produced, at a rate dependent on the effective length of the reed 104, and that this rate is gradually altered in correlation with the travel of the car, as already explained. It is also clear that this continuously varied series of impulses is transmitted to a receiver, as 82, through the working conductor 31, as before described. To increase both the rate and the force of these impulses, I include in the circuit the coils of the magnets 101, 102, between which is mounted on a shaft 111 the rotor 112 of a synchronmotor, the rotation of which will obviously vary with the vibration of the bar or reed 104. Mounted on the shaft 111, so as to be revolved by the rotor 112, are a collector ring 113 and an interrupter wheel 114, the latter being connected by a wire 115 and brush 116 to the collecting device 100, the ring and the wheel being also connected by a wire 117. Current then passes through wire 115, brush 116, wheel 114, wire 117, ring 113, wire 118, including switch 119, designating interrupter 120, and wire 121 to ground or return 44. The periphery of the wheel 114, or in the present instance one-half thereof, is provided with a plurality of spaced insulating segments 122. The designating interrupter 120 is shown as a wheel mounted on and electrically connected with a shaft 134, which is rotated by any convenient means, not shown. It has on its periphery a number of insulating segments 123, which differ in number, size or relative position in each car of the line. Thus the one wide segment and the three narrower ones following as shown, may designate, e. g., either car number 13, or car number 3 on route 1. It will be seen that when the brush 116 is passing over one-half of the wheel 114, a series of pulsating currents will be set up, varied in rate in correlation with the rate of rotation of the rotor 112, i. e., with the distance traveled by the car, and that these impulses will be transmitted through the working conductor, of which 31 is a section, to a receiver, as 82, at any point on the line. It will also be clear that this series of impulses will itself be interrupted by the segments 123, so that the spot of light traveling along the map on the plate 91 of the receiver under the eye of the observer will, by its distinctive periodic interruption, enable him to determine which car it represents.

In order that the crew of the car may be advised of the moving position of the other cars on the line, I provide the car with a receiver 124, which may be like one of those already described, and suitably mounted to prevent improper vibrations affecting its action. Mounted on the rotating shaft 111 is a second collector ring 125, connected by a wire 126 with the semi-circular segment 127 on the wheel 114, and by a brush 128 and wire 129 to the coil of the magnet 130 of the receiver 124. The other end of this coil is connected through a condenser 131 and the wire 121 to the ground 44. Obviously when the brush 116 contacts with the segment 127, the impulse producing portion of the device will be cut out, and current will flow through the coil of the receiver magnet 130, thereby affecting the reeds and indicating the moving position of all the other cars on the line, just as these are shown to the observer at the despatcher's station. To enable the crew to compare the position of its own car with those of others, I preferably shunt between the wires 121 and 129, a condenser 132, whereby a portion of the pulsating current, generated as before described, is conveyed to the receiver 124 on the car itself. The inductance 133, shown in circuit with the car-lamps 134, together with that of the magnets 101, 102, 103 and car moving motor 135, acts to prevent the generated impulses from leaking through the circuits on the car.

It is of great advantage in my car control system, not only to show the train despatcher or like officer the position of each car as it travels along the line, but also to advise him instantly of any accident. I therefore preferably provide the switch 119, for cutting out the designating interrupter 120, and inserting a telegraph key 136 in circuit with the interrupter wheel 114. By means of these the traveling spot of light on the plate 91 at the receiving station may be manually interrupted to produce code, e. g., Morse, signals, which can be easily read by the person in charge.

If an alternating current, which may be either the power current or one from a special dynamo, as already explained, is employed, the mechanical interrupter shown at the left of Fig. 13 and in Figs. 7, 8 and 9, may be omitted. In this case, the coils of the field magnets 101, 102 are joined by a wire 137, shown in dotted lines, and the rotor 112 will be an induction rotor.

On the shaft 111 is mounted a metal disk 138, see Figs. 14 and 15, between the poles of a permanent magnet 139, mounted on a longitudinally adjustable bar 140. This bar 140 is connected to the sliding bar 106, Fig. 7, or to other equivalent means for giving it a slow movement in correlation with the distance traveled by the car. As the magnet is drawn toward the periphery of the disk, its braking effect is increased, thus decreasing the rate of rotation of the rotor 112, and the rate of the impulses sent to the receiving device.

I have described a means of telegraphic communication from the car to a receiving station, but it is equally advantageous that the despatcher or other person responsible for the running of the cars be able to "talk" with the car crew. In Figs. 16 and 13, taken together, I show a station receiver 82, the actuating magnet 87 of which is connected by wire 142 to a section 32 of the working conductor, while its other pole is connected by wire 143 and telegraph key 144 to a ground 46, thus providing for the reception of the graduated impulses acting to successively vibrate the reeds 86, as already described. When one wishes to telegraph to a certain car, he first shifts the sliding weight 145 on a vibrating bar 146 to give the bar a predetermined period corresponding to that of a reed 147 on that car, see Fig. 13. It will of course be understood that the additional reeds 147 on each car are mounted adjacent to the impulse receiving reeds 86 of the receiver 124 and so as to be acted upon by the magnet 130, that each of these reeds 147 has a rate of vibration differing from that of the others, and from those of all of the reeds 86 or 148, and that the bar 146, Fig. 16, may have a scale for adjusting the weight 145 to give the bar the pitch of the reed 147 on each car. The operator then depresses the key 144, which cuts out the receiver 82, and grounds the secondary 148$^\times$ of a transformer 149. At the same time, current from primary battery 150 will flow through the coil of actuating magnet 151, bar 146, battery, wire 152, primary of transformer 149, wire 153 and key 144. The secondary current passes from ground 46, through key 144, wire 148, secondary of transformer 149, wire 142, main line or conductor sections 32 and 31, and the connections on the car, Fig. 13, including coil of magnet 130 to ground 44. The vibrating bar 146, affected by the magnet 151, will set up pulsating currents of the rate to which the reed 147 on the car is "tuned", which impulses are interrupted by the key 144, thus serving to transmit the code signals desired.

My train position indicator or car control system is also adapted for use where, as e. g. on steam trains, there is no direct metallic connection, either working conductor or other, between the car or cars and a receiving station. In other words, the energy of the signal impulses may be transmitted through space, either through Hertzian waves, magnetic or static induction or any other means. Fig. 17 shows a wireless device. The vibrating bar 154 is similar to the bar 104 of Figs. 7, 9 and 13, and carries at its free end a like interrupter 105. Its effective length is varied as the car travels by the threaded block 155, moving on the screw 156, which is similar to the screw 55 of Fig. 7, and is turned by the means there shown or by equivalent means. The actuating magnet 157 and synchromotor parts 158, 159, 160 are similar to the magnets 101, 102, 103 and rotor 112 of Fig. 13, except that a battery 161 is interposed in the circuit to feed the motor. Mounted on the rotor shaft 162 and insulated therefrom as before are a collector ring 163 and an interrupter wheel 164, connected by a wire 165. The periphery of the wheel 164 is shown as divided into quadrants, of which two opposite ones 166 are of metal divided by spaced insulating segments, the intervening quadrants 167 being entirely of insulating material. A slowly rotated designating interrupter wheel 168 is similar in construction and function to the wheel 120 of Fig. 13. The impulse producing circuit includes a battery 169, ring 163, wheel 164, wire 170, switch 171, designating interrupter 168, wire 172 and a wireless transmitter 173. The secondary of the wireless transmitter 173 is connected to ground by wire 174 and by wire 175 to the antenna 176. It will be seen that when the brush 177 on wire 170 passes over the quadrants 166, a series of impulses will be sent out from the antenna 176, which may be received on a wireless receiver connected to a receiver, as 82, Fig. 16. To enable the car to receive similar wireless impulses from other cars, it is provided with such a receiver 177, having a wireless receiver 178. To actuate this, I provide on the shaft 162 a wheel 179, having insulating quadrants 180, corresponding in radial direction with the quadrants 166 on the wheel 164. A wire 181 leads from the wheel 179 to the antenna 176, and another wire 182 from the wheel to the ground, as 43. Other wires 183 and 184 lead from the wheel to the wireless receiver 178. During each alternate quarter turn of the rotor 160, when the brush 83 bears against the insulated quadrants 167 of the interrupter wheel 164, the wires 181, 182, 183, 184 will bear against the metallic quadrants of the wheel 179, thus connecting the wireless receiver 178 with the antenna 176, and causing the magnet 185 of the vibrating reed receiver 177 to successively move the reeds therein, thereby showing the moving position of the other cars on the line, as already described.

Telegraphic communication from the car to a station is provided for by opening the switch 171 and operating the key 186, thus cutting out the designating interrupter 168, and enabling the conductor or motor-man to make and break the impulses causing the moving light spot on the station receiver, as described with reference to Fig. 13. In like manner, the reed receiver 177 is provided with an additional reed 147 for receiving code signals from the despatcher, as also described in connection with Fig. 13.

In this last named embodiment of my invention, the wireless transmitter 173 and receiver or detector 178 were described as adapted to send out and receive Hertzian waves. But if magnetic or static induction is employed, 173 will be a simple step-up transformer, the secondary of which is grounded as before by wire 174, the other wire 176 being connected to the metallic roof of the car, in the well known manner employed by Edison and others in train telegraphic systems. Or 176 may be a part adapted to semi-metallic connection to wires running parallel to the track by means of a spray of steam or vapor, as in other well known systems. It is also obvious that this form of my device may be employed with full metallic connections, as e. g. the working conductor of the line, in which case wire 176 may be connected to the power collecting device, or trolley pole.

Fig. 18 shows a form of my device to be used with Hertzian waves where the wave-length is periodically changed. The vibrating bar 104 and current breaker 105 are as shown in Figs. 7 and 9, and act, as before described, to interrupt the impulses produced at a varied rate in correlation with the distance traveled by the car. Also the designating interrupter wheel 230 is similar in structure and function to the wheel 120 of Fig. 13. A circuit is formed including interrupter 105, wire 187, switch 188, secondary winding 189 of a transformer and wire 190, back to 105. 191 is a generator for undamped Hertzian waves, one end of which is connected to the primary 192 of the transformer, its other end being connected to a button 193. A wire 194 connects the primary 192 to a second button 195. A switch 196 is adapted to connect the button 193 to ground or return line, and the button 195 to an antenna 197. The generator 191 is first tuned to a certain wave-length. When the bar 104 is vibrated by the movement of the car, as described, so that the contact in the interrupter 105 is broken at a gradually accelerated or diminished rate, the normal wave-length of the generator 191 is correspondingly changed to one dependent on the self-induction in the secondary circuit. The impulses sent out, broken by the designating interrupter 230, to denote the number etc. of the car, may be received on a Hertzian detector connected to a reed receiver, as 82, Fig. 3. Telegraphic communication from the car to a station is provided for by a switch 188 and key 199; and like communication from the station to the car by an additional reed 147 in the car receiver, both of these having been already described. This receiver on the car comprises a Hertzian detector 200, connected, as in Fig. 17, to the magnet 185 of a reed receiver 177, and also connected to buttons 201, 202, which buttons, when the switch 196 is thrown to the right of the drawing, are respectively connected to the antenna 197 and to ground. The movement of the switch 196, which may be manual or otherwise as desired, thus serves to alternately put the transmitting and receiving devices into operation. Shunt wires 203, 204 connect the secondary of the transformer and the magnet 185 of the receiver 177, thereby enabling the transmitter to show on the receiver the car's own position on the line.

Figs. 19 and 20 show means for transmitting by Hertzian waves received at a station through a metallic conductor, e. g., as described in connection with Figs. 2 and 13. Such a relay system may be useful as in an electric line, where it is desired to continuously supply other officials, from the despatcher's station, with knowledge of the moving position of the cars. 205 is an electrolytic interrupter, consisting of an outer vessel 206 and an inner vessel 207, the liquids in which are fed with current from a source, not shown, through wires 208, 209, into one of which is inserted the primary 210 of a transformer, the secondary 211 of which is connected to an antenna 212 and to ground, as 46. In the bottom of the inner vessel 207 is an aperture 213, depending above and partially closing which is a taper plug 214, attached to a suitably supported vibrating membrane 215. The membrane is wholly or partially metallic, so as to be attracted by an electro-magnet 216 adjacent its upper surface, the poles of which are in circuit with a transmitter on a car, e. g., the wire 217 may lead from a section of the working conductor and the wire 218 to ground. When current is applied to the electrolytes in the vessels 206, 207, interruptions will occur in the aperture 213 at a high rate, producing high frequency oscillations in the antenna 212. If then impulses given off from a transmitter on a car are received through the wires 217, 218, the magnet 216 will be affected, attracting the membrane 215, and raising and lowering the plug 214. Thus the cross section of the aperture will be altered at each pulsation from the car transmitter, causing the interruptions in the transformer to vary correspondingly both in rate and in energy.

Fig. 21 shows a detector or receiver for Hertzian waves 219, connected to the magnet 87 of a harmonic receiver 82, see Fig. 3, the Hertzian receiver being also connected to an antenna 220 and to a ground 46. This form of receiver may be employed with the transmitters of Figs. 17 and 18, and with the relay device of Fig. 19. If receiver 219 is tuned to a particular wave-length, this wave-length will have the strongest effect upon the receiver, and waves of different length will affect it to a less degree. If these variations are harmonic, they will successively affect the reeds 86 in the magnetic receiver 82, to show the spots of light corresponding to the moving positions of the different cars, in the manner before explained. But the Hertzian receiver 219 need not be tuned, its action in this case depending upon the constantly variable energy of the waves, whatever their length.

Inasmuch as my invention, in its fullest embodiment, provides means, not only for indicating the moving position of each car, by designation, to any number of fixed stations, as well as to all the other cars on the line; but also, for free communication, by Morse or other code, between each car and the stations, in either direction, it forms a complete car control system, and I shall so designate it in the claims. It is obvious, however, that certain parts of my invention may be used independently of the others; that the combinations described may be varied almost indefinitely; that well known devices, other than those shown, may be employed; that the harmonic signals need not be received in visual form; and that no limitations of my invention are intended except as pointed out in the claims.

I am aware of a block signal system, in which each block or section of each track of a car line is connected with a lamp at a station, the lamp being automatically switched in when the block is unoccupied and cut out when a train enters the block. In this system, each track section is connected with its signal lamp by an independent conductor; there is no series of electric impulses transmitted over a single conductor; no automatically varied series of impulses; and no receiving device which is in any sense selective, i. e., capable of receiving a series of impulses differing from each other in rate or energy, and so selecting or interpreting them as to enable the operator to distinguish the position of a car.

What I claim is:

1. A car control system comprising means on a car for producing a series of electric impulses automatically varied in correlation with the distance traveled by the car, means distant from the car for selectively receiving such impulses, and an electric connection between said producing and said receiving means, substantially for the purposes set forth.

2. A car control system comprising means on a car for producing a continuous series of electric impulses automatically varied in correlation with the distance traveled by the car, means distant from the car for selectively receiving such impulses, and an electric connection between said producing and said receiving means, substantially for the purposes set forth.

3. A car control system comprising means, including a vibrating part, on a car for producing a series of electric impulses automatically varied in correlation with the distance traveled by the car; means distant from the car for selectively receiving such impulses; and an electric connection between said producing and said receiving means, substantially for the purposes set forth.

4. A car control system comprising means on a car for producing a series of electric impulses, including a vibrating part, the rate of movement of which is automatically varied in correlation with the distance traveled by the car; means distant from the car for selectively receiving such impulses; and an electric connection between said producing and said receiving means, substantially for the purposes set forth.

5. A car control system comprising means on a car for producing a series of electric impulses varied in correlation with the number of revolutions made by a wheel of the car, means distant from the car for selectively receiving such impulses; and an electric connection between said producing and said receiving means, substantially for the purposes set forth.

6. A car control system comprising means on a car, including a part exterior to the car and moved by contact with a rail, for producing a series of electric impulses automatically varied in correlation with the distance traveled by the car; means distant from the car for selectively receiving such impulses; and an electric connection between said producing and said receiving means, substantially for the purposes set forth.

7. A car control system comprising means on a car, including a rotating part exterior to the car and moved by contact with a rail, for producing a series of electric impulses automatically varied in correlation with the distance traveled by the car; means distant from the car for selectively receiving such impulses; and an electric connection between said producing and said receiving means, substantially for the purposes set forth.

8. A car control system comprising means on a car for producing a series of electric impulses automatically varied in correlation with the distance traveled by the car; a plurality of independent means distant from the car for selectively receiving such impulses; and an electric connection between said producing and each of said receiving means, substantially for the purposes set forth.

9. A car control system comprising means on a car for producing a series of electric impulses automatically varied in correlation with the distance traveled by the car; means distant from the car for selectively receiving such impulses in the form of visual signals; and an electric connection between said producing and said receiving means, substantially for the purposes set forth.

10. A car control system comprising means on a car for producing a series of electric impulses automatically varied in correlation with the distance traveled by the car; means distant from the car, and including a graduated series of vibrating parts, for selectively receiving such impulses; and an electric connection between said producing and said receiving means, substantially for the purposes set forth.

11. A car control system comprising means on a car for producing a series of electric impulses automatically varied in correlation with the distance traveled by the car; means distant from the car; and including a graduated series of vibrating and light-reflecting parts, for selectively receiving such impulses; and an electric connection between said producing and said receiving means, substantially for the purposes set forth.

12. A car control system comprising means on a car for producing a series of electric impulses automatically varied in correlation with the distance traveled by the car; means distant from the car, and including a graduated series of magnetically actuated vibrating parts, for selectively receiving such impulses; and an electric connection between said producing and said receiving means, substantially for the purposes set forth.

13. A car control system comprising means on a car for producing a series of electric impulses automatically varied in correlation with the distance traveled by the car; means distant from the car for selectively receiving such impulses; and an electric conductor, at least partially metallic, between said producing and said receiving means, substantially for the purposes set forth.

14. A car control system comprising means on a car for producing a series of electric impulses automatically varied in correlation with the distance traveled by the car; means distant from the car for selectively receiving such impulses; and a metallic electric conductor between said producing and said receiving means, substantially for the purposes set forth.

15. An electric-car control system comprising means on a car for producing a series of electric impulses automatically varied in correlation with the distance traveled by the car; means distant from the car for selectively receiving such impulses; and an electric connection, including the working conductor of the electric line, between said producing and said receiving means, substantially for the purposes set forth.

16. A car control system comprising means for generating an electric current; means on a car for interrupting such current so as to produce a series of electric impulses automatically varied in correlation with the distance traveled by the car; means distant from the car for selectively receiving such impulses; and an electric connection between said producing and said receiving means, substantially for the purposes set forth.

17. A car control system comprising means distant from a car for generating an electric current; means on a car for interrupting such current so as to produce a series of electric impulses automatically varied in correlation with the distance traveled by the car; means distant from the car for selectively receiving such impulses; and an electric connection between said producing and said receiving means, substantially for the purposes set forth.

18. An electric-car control system comprising a power generating station; means on a car for interrupting a portion of the current received from said station so as to produce a series of electric impulses automatically varied in correlation with the distance traveled by the car; means distant from the car for selectively receiving such impulses; and an electric connection between said producing and said receiving means, substantially for the purposes set forth.

19. An electric-car control system comprising a power generating station; a working conductor; means on a car for interrupting a portion of the current received through said conductor so as to produce a series of electric impulses varied in correlation with the distance traveled by the car; means distant from the car for selectively receiving such impulses; and an electric connection, including said conductor, between said producing and said receiving means, substantially for the purposes set forth.

20. A car control system comprising a plurality of cars; means on each car for producing a distinctive series of electric impulses varied in correlation with the distance traveled by said car; a distant station having means for selectively receiving such impulses and for distinguishing between those sent from different cars; and an electric connection between said cars and said station, substantially for the purposes set forth.

21. A car control system comprising a plurality of cars; means on each car for producing a series of electric impulses automatically varied in correlation with the distance traveled by the car; means on each car for periodically interrupting such series in a distinctive manner; a distant station having means for selectively receiving such distinctive series of impulses; and an electric connection between said cars and said station, substantially for the purposes set forth.

22. A car control system comprising a plurality of cars; means on one of said cars for producing a series of electric impulses automatically varied in correlation with the distance traveled by the car; means on another of said cars for selectively receiving such impulses; and an electric connection between said cars, substantially for the purposes set forth.

23. A car control system comprising a plurality of cars; means on one of said cars for producing a series of electric impulses automatically varied in correlation with the distance traveled by the car; means on another of said cars for selectively receiving such impulses; and a metallic electric conductor between said cars, substantially for the purposes set forth.

24. An electric-car control system comprising a plurality of cars; means on one of said cars for producing a series of electric impulses automatically varied in correlation with the distance traveled by the car; means on another of said cars for selectively receiving such impulses; and an electric connection, including the working conductor of the electric line, between said producing and said receiving means, substantially for the purposes set forth.

25. A car control system comprising a plurality of cars; means on each car for producing a distinctive series of electric impulses automatically varied in correlation with the distance traveled by the car; means on each car for selectively receiving such impulses and for distinguishing between those received from different cars; and an electric connection between said cars, substantially for the purposes set forth.

26. An electric-car control system comprising a plurality of cars; means on each car for producing a distinctive series of electric impulses automatically varied in correlation with the distance traveled by the car; means on each car for selectively receiving such impulses and for distinguishing between those received from different cars; and an electric connection, including the working conductor of the electric line, between said producing and said receiving means, substantially for the purposes set forth.

27. In a car control system, means on a car for producing a series of electric impulses automatically varied in correlation with the distance traveled by the car; means distant from the car for selectively receiving such impulses; and means for utilizing said producing and said receiving means for the transmission of code signals, substantially for the purposes set forth.

28. In a car control system, means on a car for producing a series of electric impulses automatically varied in correlation with the distance traveled by the car; means for utilizing such impulses to produce code signals; and means distant from the car for simultaneously receiving such impulses so as to determine the moving position of the car and for reading such signals, substantially for the purposes set forth.

29. In a car control system, means on a car for producing a series of electric impulses automatically varied in correlation with the distance traveled by the car; a telegraph key; means for switching said key into circuit with said producing means to enable it to interrupt such impulses so as to produce code signals; and means distant from the car for receiving such impulses so as to determine the moving position of the car and for reading such signals, substantially for the purposes set forth.

30. In a car control system, means on a car for producing a series of electric impulses automatically varied in correlation with the distance traveled by the car; means for utilizing such impulses to produce code signals; a station distant from the car for receiving such impulses so as to determine the moving position of the car and for reading such signals; means at the station for sending code signals; and means on the car for receiving such signals from the station, substantially for the purposes set forth.

31. In a car control system, a plurality of cars; means on each of said cars for producing a series of electric impulses automatically varied in correlation with the distance traveled by the car; means on each car for selectively receiving such impulses; and means on each car for utilizing said producing and said receiving means for the transmission of code signals, substantially for the purposes set forth.

32. In a car control system, a plurality of cars; means on each car for producing a series of electric impulses automatically varied in correlation with the distance traveled by the car; means on each car, for periodically interrupting such series in a distinctive manner; means on each car operative alternatively with said interrupting means, for utilizing such impulses to produce code signals; and means on each car for receiving such impulses from the other car to determine its moving position and for reading the signals sent therefrom, substantially for the purposes set forth.

33. A car control system comprising means on a car for producing a series of electric impulses automatically varied in correlation with the distance traveled by the car, a plurality of independent means distant from the car for selectively receiving such impulses, and an electric connection between said producing and each of said receiving means, substantially for the purposes set forth.

34. In a car control system, means on a car for producing a series of electric impulses automatically varied in correlation with the distance traveled by the car; a relay device electrically connected with said producing means for receiving and transmitting such impulses; and means distant from said relay for selectively receiving the impulses transmitted therefrom, substantially for the purposes set forth.

35. In a car control system, means on a car for producing a series of electric impulses automatically varied in correlation with the distance traveled by the car; a relay device, including an electrolytic interrupter, for receiving and transmitting such impulses, and means distant from said relay for selectively receiving the impulses transmitted therefrom, substantially for the purposes set forth.

36. In a car control system comprising a plurality of cars, means on each car for producing a series of electric impulses automatically varied in correlation with the distance traveled by the car; and circuit breaking means on each car for interrupting such series in a distinctive manner, substantially for the purposes set forth.

37. In a car control system comprising a plurality of cars, means on each car for producing a series of electric impulses automatically varied in correlation with the distance traveled by the car; and automatically operative circuit breaking means on each car for interrupting such series in a distinctive manner, substantially for the purposes set forth.

38. In a car control system of the class described, a car; a receiving device including a harmonic series of vibrating reeds; and means for giving said reeds a successive vibratory movement in correlation with the distance traveled by said car, substantially for the purposes set forth.

39. In a car control system of the class described, a car; a receiving device including a harmonic series of reeds and a magnetically actuated vibrating diaphragm for giving successive vibratory movement to said reeds; and means for vibrating said diaphragm in correlation with the distance traveled by said car, substantially for the purposes set forth.

40. In a car control system of the class described, a receiving device comprising a harmonic series of vibratory reeds, and a telephone receiver, said receiver and said reeds being so arranged that the vibrations of the diaphragm of said receiver act to vibrate said reeds, substantially for the purposes set forth.

41. In a car control system of the class described, a receiving device comprising a harmonic series of vibratory reeds, a telephone receiver, and a bell or sounding-board for confining the vibrations of the diaphragm of said receiver so as to enable them to act upon and vibrate said reeds, substantially for the purposes set forth.

42. In an electric-car control system, a plurality of working conductor sections; power feed connections therefor; and condensers connecting said sections to form electric connections therebetween independent of said power feed connections, substantially for the purposes set forth.

OLAF HALVORSEN.

Witnesses:
 Geo. L. Cooper,
 B. M. Tolhurst.